United States Patent
Bitra et al.

(10) Patent No.: US 9,948,394 B1
(45) Date of Patent: Apr. 17, 2018

(54) POWER OPTIMIZATION IN VISIBLE LIGHT COMMUNICATION POSITIONING

(71) Applicant: QUALCOMM Incorporated, San Diego, CA (US)

(72) Inventors: Suresh Kumar Bitra, Mangalagiri (IN); Meghna Agrawal, Cupertino, CA (US)

(73) Assignee: QUACOMM Incorporated, San Diego, CA (US)

( * ) Notice: Subject to any disclaimer, the term of this patent is extended or adjusted under 35 U.S.C. 154(b) by 0 days.

(21) Appl. No.: 15/458,791

(22) Filed: Mar. 14, 2017

(51) Int. Cl.
*H04B 10/116* (2013.01)
*H04B 10/80* (2013.01)
*H04B 10/079* (2013.01)

(52) U.S. Cl.
CPC ........ *H04B 10/116* (2013.01); *H04B 10/079* (2013.01); *H04B 10/806* (2013.01)

(58) Field of Classification Search
CPC .................................................. H04B 10/116
See application file for complete search history.

(56) References Cited

U.S. PATENT DOCUMENTS

| 2014/0375982 | A1* | 12/2014 | Jovicic | G01B 11/14 356/72 |
|---|---|---|---|---|
| 2015/0280823 | A1 | 10/2015 | Breuer et al. | |
| 2016/0178724 | A1* | 6/2016 | Ganick | G01S 1/70 398/131 |
| 2016/0195604 | A1 | 7/2016 | Ryan et al. | |
| 2018/0006724 | A1* | 1/2018 | Wennemyr | H04B 10/116 |

FOREIGN PATENT DOCUMENTS

WO    WO-2015148561 A2    10/2015

OTHER PUBLICATIONS

Rajagopal N., et al., "Hybrid Visible Light Communication for Cameras and Low-Power Embedded Devices", Electrical and Computer Engineering Department, Carnegie Mellon University, Sep. 2014, pp. 1-6.

* cited by examiner

Primary Examiner — Shi K Li
(74) Attorney, Agent, or Firm — Silicon Valley Patent Group LLP

(57) ABSTRACT

Embodiments of apparatuses and methods of power optimization in VLC positioning are disclosed. In one embodiment, a mobile device may include image sensors configured to receive visible light communication signals, a memory configured to store the visible light communication signals, and a transceiver configured to receive positioning assistance data of a venue, and a controller configured to: decode one or more light fixtures within a field of view of the mobile device to obtain corresponding light fixture identifications, determine a motion of the mobile device with respect to the one or more light fixtures based on the light fixture identifications and the positioning assistance data of the venue, and switch the image sensors of the mobile device to a reduced duty cycle state based on the motion of the mobile device with respect to the one or more light fixtures within the field of view of the mobile device.

30 Claims, 10 Drawing Sheets

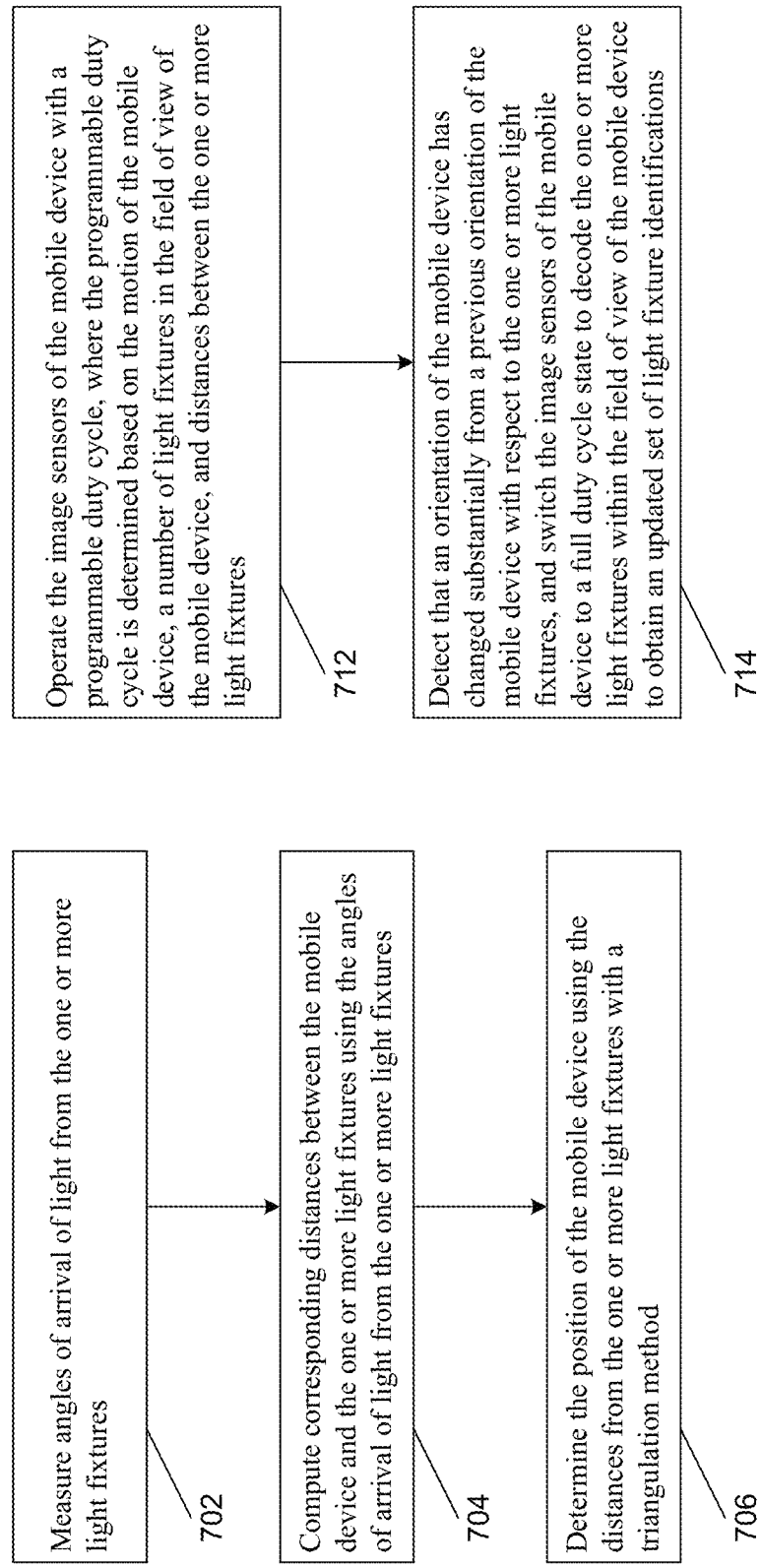

POWER OPTIMIZATION IN VISIBLE LIGHT COMMUNICATION POSITIONING

FIELD

The present disclosure relates to the field of positioning of mobile devices. In particular, the present disclosure relates to apparatuses and methods for power optimization in visible light communication (VLC) positioning.

BACKGROUND

Recently, interest in radio over fiber technologies complementary to Radio Frequency (RF) technologies has increased due to the exhaustion of RF band frequencies, potential crosstalk between several wireless communication technologies, increased demand for communication security, and the advent of an ultra-high speed ubiquitous communication environment based on various wireless technologies. Consequently, visible light communication employing visible light LEDs has been developed to complement RF technologies.

FIG. 1 illustrates a timing diagram of a conventional implementation of visible light communication positioning. As shown in FIG. 1, to estimate the location using VLC, a mobile device decodes the light source identification transmitted continuously, represented by the double arrows 102a through 102g, throughout each duty cycle of VLC signaling. Typically, decoding each VLC message can take half one second to one second to process depending on the data rate being used. Generally, the image sensors are therefore enabled almost all the time, which results in significant power consumption in operating the image sensors and decoding the VLC messages.

Therefore, there is a need for apparatuses and methods for power optimization in visible light communication positioning.

SUMMARY

Embodiments of apparatuses and methods of power optimization in visible light communication positioning are disclosed. In one embodiment, a mobile device may include image sensors configured to receive visible light communication signals, a memory configured to store the visible light communication signals, and a transceiver configured to receive positioning assistance data of a venue, where the positioning assistance data includes identifications and positions of light fixtures in the venue. The mobile device may further include a controller configured to: decode one or more light fixtures within a field of view of the mobile device to obtain corresponding light fixture identifications, determine a motion of the mobile device with respect to the one or more light fixtures based on the light fixture identifications and the positioning assistance data of the venue, and switch the image sensors of the mobile device to a reduced duty cycle state based on the motion of the mobile device with respect to the one or more light fixtures within the field of view of the mobile device.

In another embodiment, a method of power optimization in visible light communication (VLC) positioning of a mobile device may include receiving positioning assistance data of a venue, where the positioning assistance data includes identifications and positions of light fixtures in the venue, decoding one or more light fixtures within a field of view of the mobile device to obtain corresponding light fixture identifications, determining a motion of the mobile device with respect to the one or more light fixtures based on the light fixture identifications and the positioning assistance data of the venue, and switching image sensors of the mobile device to a reduced duty cycle state based on the motion of the mobile device with respect to the one or more light fixtures within the field of view of the mobile device.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the non-limiting and non-exhaustive aspects of following drawings. The drawings are shown for illustration purposes and they are not drawn to scale. Like numbers are used throughout the figures.

FIG. 7A illustrates an exemplary implementation of determining a position of a mobile device in a VLC environment according to aspects of the present disclosure.

FIG. 7B illustrates an exemplary implementation of operating image sensors of a mobile device according to aspects of the present disclosure.

DESCRIPTION OF EMBODIMENTS

Embodiments of apparatuses and methods for power optimization in visible light communication positioning are disclosed. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the scope of the disclosure. Thus, the present disclosure is not intended to be limited to the examples described and shown, but is to be accorded the scope consistent with the principles and features disclosed herein. The word "exemplary" or "example" is used herein to mean "serving as an example, instance, or illustration." Any aspect or embodiment described herein as "exemplary" or as an "example" is not necessarily to be construed as preferred or advantageous over other aspects or embodiments.

According to aspects of the present disclosure, visible light communication is a method of communication using modulation of a light intensity emitted by a light fixture, such as a light emitting diode (LED) luminary device. Visible light is light having a wavelength in a range that is visible to the human eye. The wavelength of the visible light is in the range of 380 to 780 nm. Since humans cannot perceive on-off cycles of a LED luminary device above a certain number of cycles per second, for example 150 Hz, LEDs may use Pulse Width Modulation (PWM) to increase the lifespan thereof and save energy.

Figure 1:
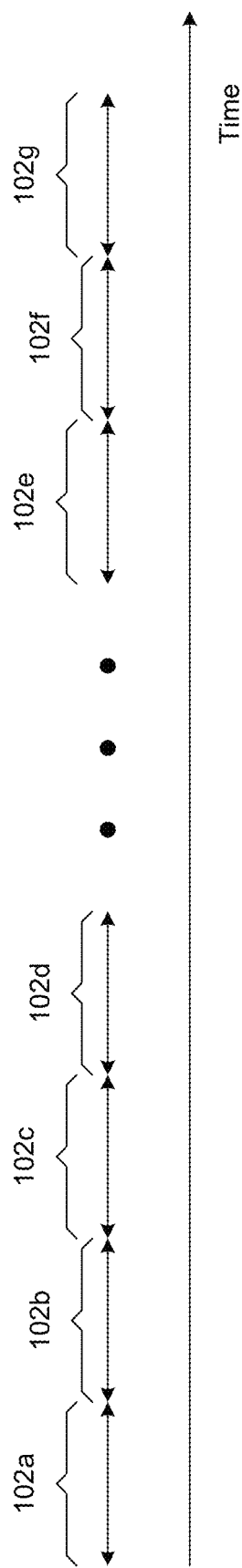
FIG. 1 illustrates a timing diagram of a conventional implementation of visible light communication positioning.
Figure 2:
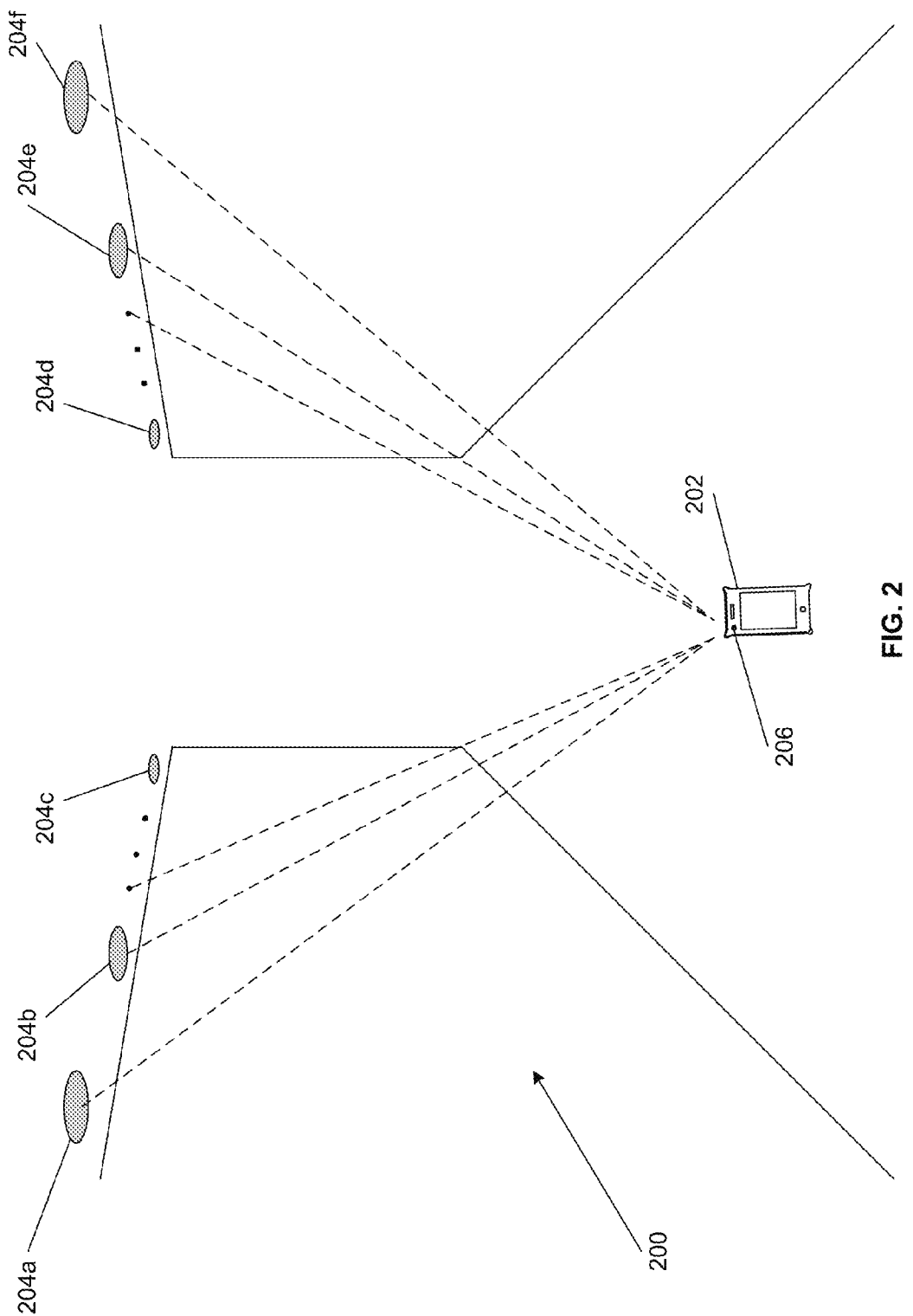
FIG. 2 illustrates an exemplary environment for power optimization in visible light communication positioning according to aspects of the present disclosure.

FIG. 2 illustrates an exemplary environment for power optimization in visible light communication positioning according to aspects of the present disclosure. As shown in FIG. 2, in the exemplary environment 200, a mobile device 202 may observe one or more light fixtures, such as LEDs 204a, 204b, 204c, 204d, 204e, 204f, in the field of view (FOV) of camera 206 of the mobile device 202. According to aspects of the present disclosure, the field of view is that part of the world that is visible through the lens of the camera at a particular position and orientation in space. Objects outside the FOV when an image is captured are not recorded in the camera. The term FOV can sometimes be used to refer to a physical characteristic of a lens system, and when used in this way, the FOV may refer to the angular size of the view cone, which may be alternatively referred to as an angle of view. As used herein, however, the FOV refers to that which is visible in a camera system given the lens stack (with its optical characteristics, including the angle of view) at a particular location in a particular orientation.

According to aspects of the present disclosure, light fixtures, such as LEDs 204a through 204f, may broadcast positioning signals by modulating their light output level over time in the visible light communication mode. LED light output can be modulated at relatively high frequencies. Using modulation frequencies in the kHz range ensures that VLC signals will not cause any light flicker that could be perceived by to the human eye, while at the same time allowing for sufficiently high data rates for positioning. The VLC signals can be designed in such a way that the energy efficiency of the light fixture is not compromised, and this is achieved, for example, by using binary modulation. This type of modulation can be produced by highly efficient boost converters that are an integral component PWM-dimmable LED drivers. In addition to being efficient and compatible with existing driver hardware, the VLC signal can also conform to the standard methods of dimming based on the PWM and variation of the maximum current.

The VLC signal transmitted by each light fixture conveys a unique identification which differentiates that light fixture from other light fixtures in the venue. The assistance data that contains a map of locations of the light fixtures and their identifications may be created at the time the system is installed, and may be stored on a remote server. To determine its position, a mobile device may download the assistance data and may reference it every time the mobile device decodes light fixture identification from a VLC signal.

The identification may be either stored internally in the driver or may be supplied from an external system, such as a Bluetooth wireless mesh network. A light fixture may periodically switch to transmitting a new identification in order to prevent unauthorized use of the positioning infrastructure.

Figure 3:
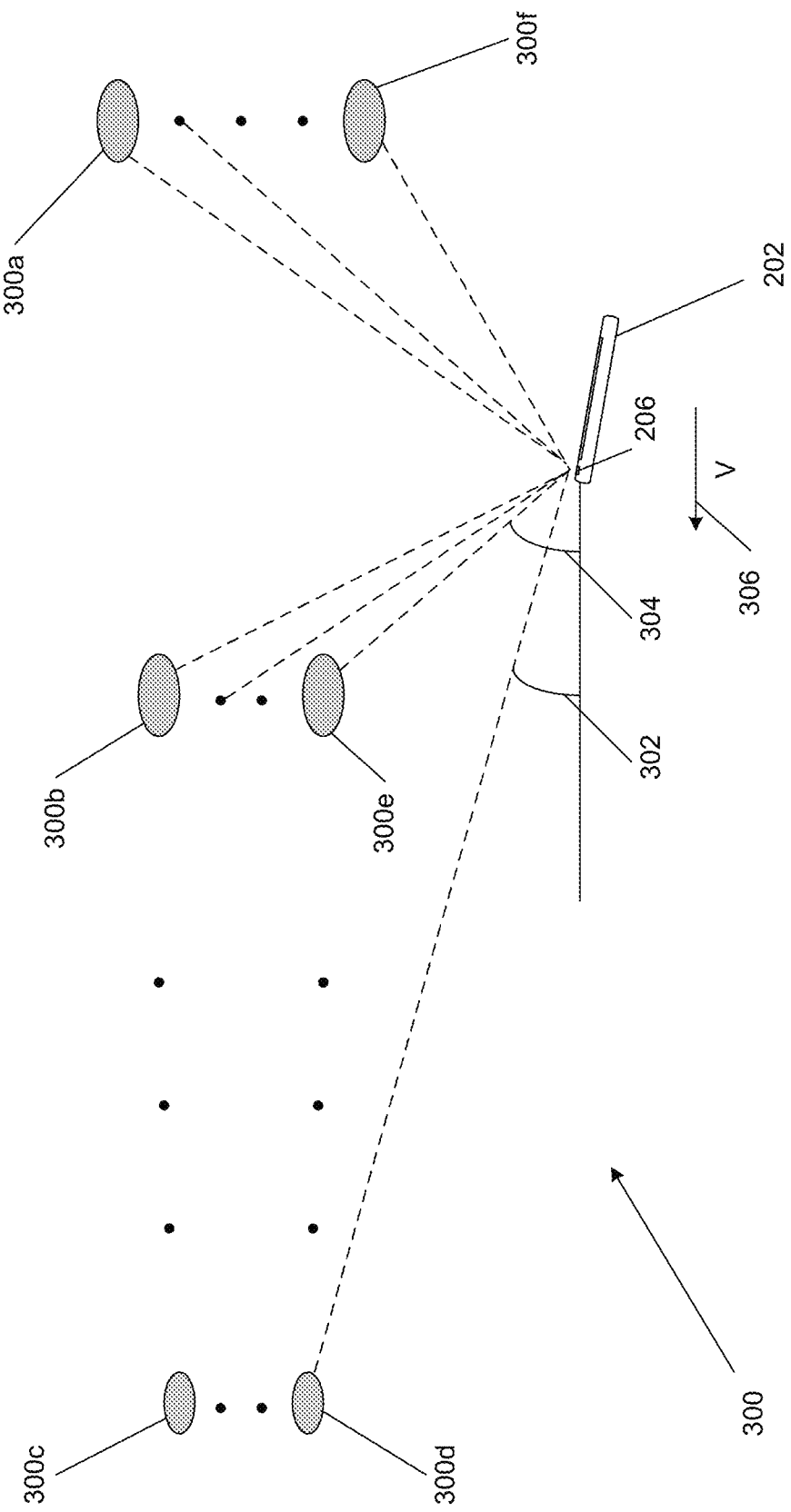
FIG. 3 illustrates another exemplary environment for power optimization in visible light communication positioning according to aspects of the present disclosure.

FIG. 3 illustrates another exemplary environment for power optimization in visible light communication positioning according to aspects of the present disclosure. As shown in FIG. 3, in the exemplary environment 300, mobile device 202 may observe one or more light fixtures, such as LEDs 300a, 300b, 300c, 300d, 300e, 300f, in the field of view of camera 206 of the mobile device 202. Numerals 302 and 304 indicate angle of arrival of light at an image sensor of the mobile device 202 from LEDs 300d and 300e, respectively. In this example, the mobile device 202 may be in motion, as indicated by arrow 306 with velocity V.

According to aspects of the present disclosure, the mobile device 202 may use a light fixture's identification as well as angle of arrival of light from the light fixture to estimate its position. Based on the mobile device's orientation and motion, the light fixtures visible at any position may remain substantially the same for a period of time. Thus, when the same light fixtures are available in the FOV, mobile device 202 can be configured to estimate its position by using angle of arrival of light and previously decoded identifications of the light fixtures in the environment 300. Since, angle of arrival estimation may take less time than full identity detection, image sensors can be configured to be enabled or disabled periodically. The disabling of the image sensors and the intermittent decoding of VLC messages can result in significant power savings over conventional solutions. In some implementations, to determine the FOV of the image sensor, the controller may first identify a subset of the pixel array where the source of the VLC signal is visible. Note that the FOV may have a larger signal to noise ratio than the rest of the image. The controller may identify this region by identifying pixels that are brighter than the others. For example, it may set a threshold T, such that if the pixel intensity in luminance value is greater than T, the pixel may then be considered to be part of the FOV. The threshold T may, for instance, be the 50% luminance value of the image.

According to aspects of the present disclosure, a controller/processor of the mobile device 202 can be configured to decode the light fixture identifications for neighboring light fixtures or visible light fixtures in the environment. In one exemplary approach, the controller can be configured to decode light fixtures in the FOV of the mobile device. Using the decoded identifications of the light fixtures and assistance data of the environment 300, the controller can estimate the position of the mobile device and determine the relative position of neighboring light fixtures. As the position/orientation of the mobile device changes, the controller may continue to use light fixtures identifications as well as angle of arrival to estimate the position of the mobile device.

In some embodiments, in situations when the motion of a mobile device is low, or the mobile device is moving slowly, or stationary, if the same light fixtures are visible, the mobile device may enter a reduced duty cycle state, where the image sensors may be switched off for a period of time and be turned ON only for a programmable duration in a reduced duty cycle state. According to aspects of the present disclosure, in the reduced duty cycle state, the controller may skip decoding the light fixture identification and may measure the light pixels from the particular light fixture. In some implementations, light fixtures in the FOV of the image sensors can be detected based on just one or two image sensor full frames. Based on the last FOV information for a particular light fixture and mobile device orientation and motion information, the controller may predict the upcoming FOV of the particular light fixture in the environment. In addition, the controller may be configured to compute the likelihood between predicted FOV and observed/measured FOV. If the likelihood is high, then controller may determine that the previously decoded identification of the light fixtures can be used for positioning.

In some embodiments, the controller may also examine the similarities between two image frames to determine the validity of previously decoded identifications of the light fixtures. The position of the mobile device may be calculated using measurements of the angle of arrival of the light fixtures signal. Based on this angle computation and light fixtures position information, the distance between the mobile device and the light fixtures in the FOV of the mobile device can be computed. Using the triangulation method, the mobile device's precise position may then be calculated based on the distance between the mobile device and the light fixtures in the FOV of the mobile device.

Figure 4:
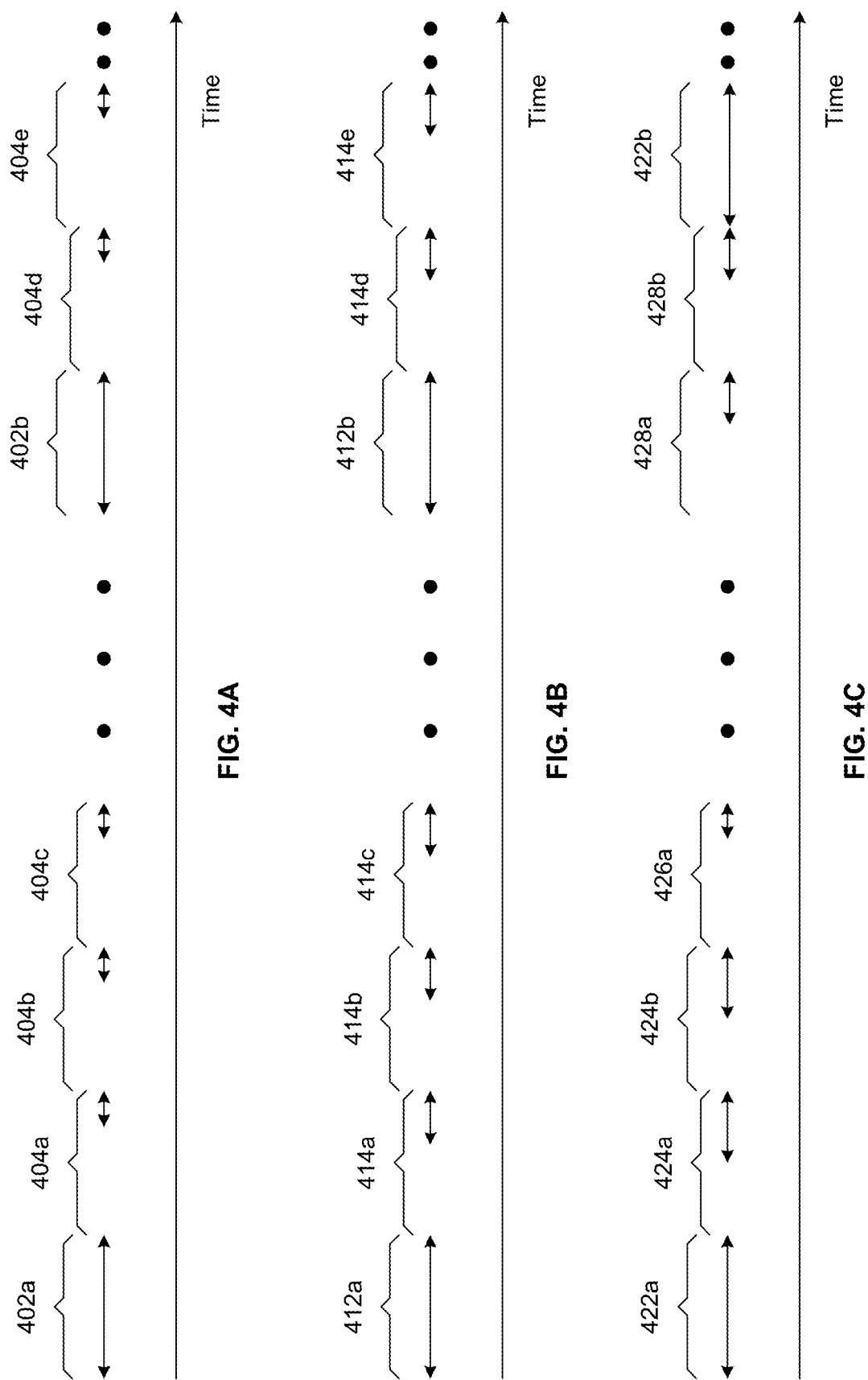
FIGS. 4A-4C illustrate timing diagrams of exemplary implementations of power optimization in visible light communication positioning according to aspects of the present disclosure.

According to aspects of the present disclosure, mobile device 202 can be configured to decode the light fixture identifications and enable/disable image sensors periodically. FIG. 4A illustrates a timing diagram of an exemplary implementation of power optimization in visible light communication positioning according to aspects of the present disclosure. In the example of FIG. 4A, a controller of mobile device 202 may switch between a regular duty cycle state (also referred to as a full duty cycle state) and a reduced duty cycle state. In the regular duty cycle state, represented by numerals 402a and 402b, image sensors are turned on all of the time and the controller decodes signals acquired by the image sensors to identify light fixtures in the FOV of the mobile device. In the reduced duty cycle state, represented by numerals 404a through 404e, image sensors may be turned off for a programmable period, for example 80%, 90% or 95% of the duty cycle, based on the orientation and/or motion of the mobile device with respect to the one or more light fixtures in the FOV of the mobile device. Note that FIG. 4A may be applicable to situations where the mobile device is stationery or the mobile device may be moving below a predetermined threshold velocity.

In some embodiments, the controller of the mobile device 202 can be configured to periodically enable and disable of image sensors at a reduced duty cycle based on the motion of the mobile device with respect to the one or more light fixtures in FOV of the mobile device. In the reduced duty cycle state, the image sensor may be turned off, which in turn saves power consumption by the mobile device. In situations when the mobile device detects the orientation of the device has changed considerably or the mobile device has moved to a new location, the controller may return to the regular duty cycle state (also known as the acquisition mode) where the controller can detect light fixture identifications and decode VLC signals in the FOV of the mobile device.

According to aspects of the present disclosure, the controller can be configured to predict identifications of neighboring light fixtures in the FOV of the mobile device. In one exemplary approach, the mobile device may predict the identifications of neighboring light fixtures based on assistance data of the environment 200 and the direction of motion of mobile device. For example, if four light fixtures are present in the mobile device image sensor's FOV and the identifications of three fixtures are already known, then the controller can predict the identification of the fourth light fixture based on the relative position of the fourth light fixture with respect to the other three light fixtures obtained from the assistance data of the venue. Using this approach, the controller may predict the identifications of light fixtures that may come into the FOV of the mobile device 202.

According to aspects of the present disclosure, in the process of predicting the identifications of the light fixtures, the mobile device 202 may also estimate the likelihood of the prediction. The estimated likelihood may be based on the following factors, including but not limited to: 1) likelihood of the known light fixture identifications; 2) likelihood of predicted position (using previous position, device motion information and assistance data) and estimated position of the mobile device; 3) similarity between previous and new image; or 4) a combination of one or more of the above factors. In some implementations, if the estimated likelihood falls below a threshold, then controller may return to the acquisition mode and perform a full detection of identifications of the light fixtures in the FOV of the mobile device.

FIG. 4B illustrate a timing diagram of another exemplary implementation of power optimization in visible light communication positioning according to aspects of the present disclosure. Similar to the example of FIG. 4A, the controller of mobile device 202 may switch between a regular duty cycle state and a reduced cycle state. In the regular duty cycle state, represented by numerals 412a and 412b, image sensors are turned on and the controller decodes signals acquired by the image sensors to identify light fixtures in the FOV of the mobile device. In the reduced duty cycle state, represented by numerals 414a through 414e, image sensors may be turned off for a programmable period, for example 60%, 70%, or 80% of the cycle, based on the orientation and/or motion of the mobile device with respect to the one or more light fixtures in FOV of the mobile device. FIG. 4B may be applicable to situations where the mobile device is moving faster than the predetermined threshold velocity of FIG. 4A.

In one exemplary situation, light fixtures in the venue are three meters apart; current image sensor's view has 3 light fixtures (that is, image sensor view is 10 meters by 10 meters); and the mobile device is moving at 0.5 meter per second. In this case, a light fixture may remain in the image sensor's view for about 20 seconds (10/0.5=20 seconds). After the controller has identified all the light fixtures in the FOV of the mobile device, the controller may not need to decode them again. Thus, in this case, the mobile device can be set to the reduced duty cycle state and use partial decoding for about 20 seconds. Then, the controller may turn on full decoding to get identifications of new light fixtures. After the controller has obtained the identifications of the new light fixtures, the mobile device may return to the reduced duty cycle state.

In some implementations, in order to increase reliability, the controller may switch to full decoding mode, even before all the known light fixtures are out of view. For example, in the above case, the controller may move to full decoding after 2 (out of 3) light fixtures are out of view. In this scenario, the image sensors may be turned off and the controller may use partial decoding for about 12 second in each cycle.

FIG. 4C illustrate a time diagram of another exemplary implementation of power optimization in visible light communication positioning according to aspects of the present disclosure. Similar to the example of FIG. 4A, the controller of mobile device 202 may switch between a regular duty cycle state and a reduced cycle state. In the regular duty cycle state, represented by numerals 422a and 422b, image sensors are turned on and the controller decodes signals acquired by the image sensors to identify light fixtures in the FOV of the mobile device. In the reduced duty cycle state, represented by numerals 424a-424e, 426a, and 428a-428b, image sensors may be turned off for a programmable period, based on the orientation and/or motion of the mobile device with respect to the one or more light fixtures within the field of view of the mobile device.

Note that FIG. 4C may be applicable to situations where the mobile device is moving at various speeds. For example, the mobile device moves faster in reduced cycle states 424a and 424b than in reduced cycle states 428a and 428b; and the mobile device moves faster in reduced cycle states 428a and 428b than in reduced cycle state 426a. The controller of the mobile device may be configured to adjust the duration when the image sensors are turned off based on changes in the speed and/or orientation of the mobile device with respect to the light fixtures in the FOV of the mobile device. In the example of FIG. 4C, when it is detected that the mobile device is moving at a higher speed, the duty cycle can be increased to decode signals acquired from the light fixtures in the FOV of the mobile device more frequently as shown in the reduced duty cycle states 424a and 424b. On the other hand, when it is detected that the mobile device is moving at a lower speed, the duty cycle can be decreased to decode signals acquired from the light fixtures in the FOV of the mobile device less frequently as shown in the reduced duty cycle state 426a.

In one exemplary situation, if user is moving at speed of 1 m/second (instead of 0.1 meter per second), then partial decoding time may be reduce by half. In another exemplary situation, the orientation of the mobile device can change and light fixtures may not stay in image sensor's view for a long time due to movements of the user. In this case, the controller may adjust the period of partial decoding based on the changes in orientation of the mobile device. If the light fixtures remain in image sensors view for about 1 second, then controller may reduce the duty cycle to about 1 second. In the above situations, the controller may dynamically adjust the duty cycle based on the changes in speed and/or orientation of the mobile device.

In yet another exemplary situation, when multiple light fixtures are available, the controller can be configured to predict the identification of light fixtures coming into the FOV of the mobile device. For example, if three light fixtures are available in image sensor's FOV, out of which the controller already has the identifications of two light fixtures, but not the third one (a light fixture coming into FOV of the mobile device). Then the controller may predict the identification of third light fixture using the assistance data of the venue. In this case, the mobile device may continue to be in the reduced duty cycle state for some more time, for example until all the light fixtures with measured identifications are out of view.

Figure 5:
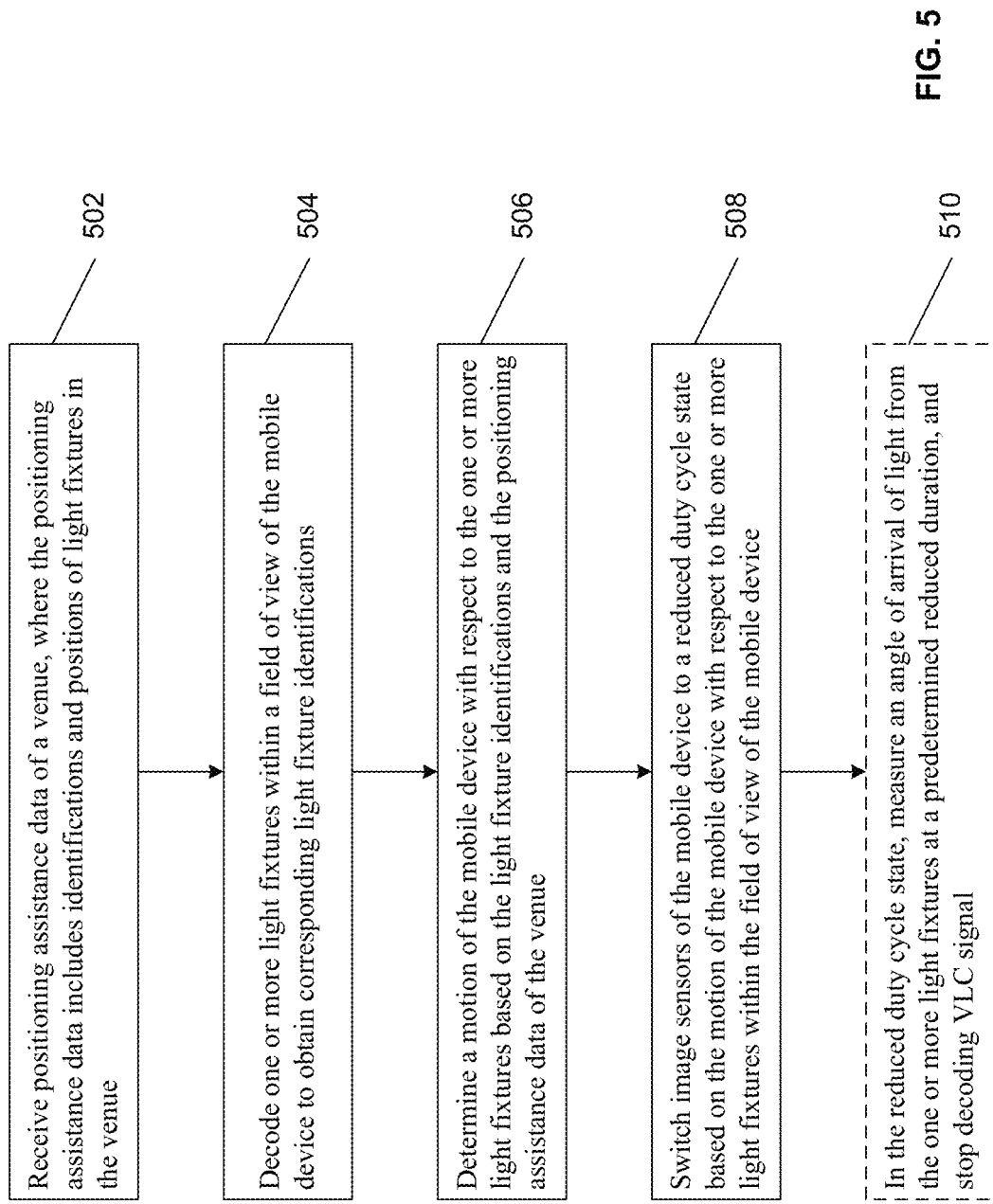
FIG. 5 illustrates an exemplary implementation of power optimization in visible light communication positioning according to aspects of the present disclosure.

FIG. 5 illustrates an exemplary implementation of power optimization in visible light communication positioning according to aspects of the present disclosure. In block 502, a controller is configured to receive positioning assistance data of a venue, where the positioning assistance data includes identifications and positions of light fixtures in the venue. The controller is further configured to extract the identifications and positions of light figures in the venue from received positioning assistance data of the venue. In block 504, the controller is configured to decode one or more light fixtures within a field of view of the mobile device to obtain corresponding light fixture identifications. In block 506, the controller is configured to determine a motion of the mobile device with respect to the one or more light fixtures based on the light fixture identifications and the positioning assistance data of the venue. In block 508, the controller is configured to switch image sensors of the mobile device to a reduced duty cycle state based on the motion of the mobile device with respect to the one or more light fixtures within the field of view of the mobile device. In block 510, in the reduced duty cycle state, the controller may be optionally configured to measure an angle of arrival of light from the one or more light fixtures and stop decoding VLC signal for a programmable reduced duration.

Figures 6A, 6B:
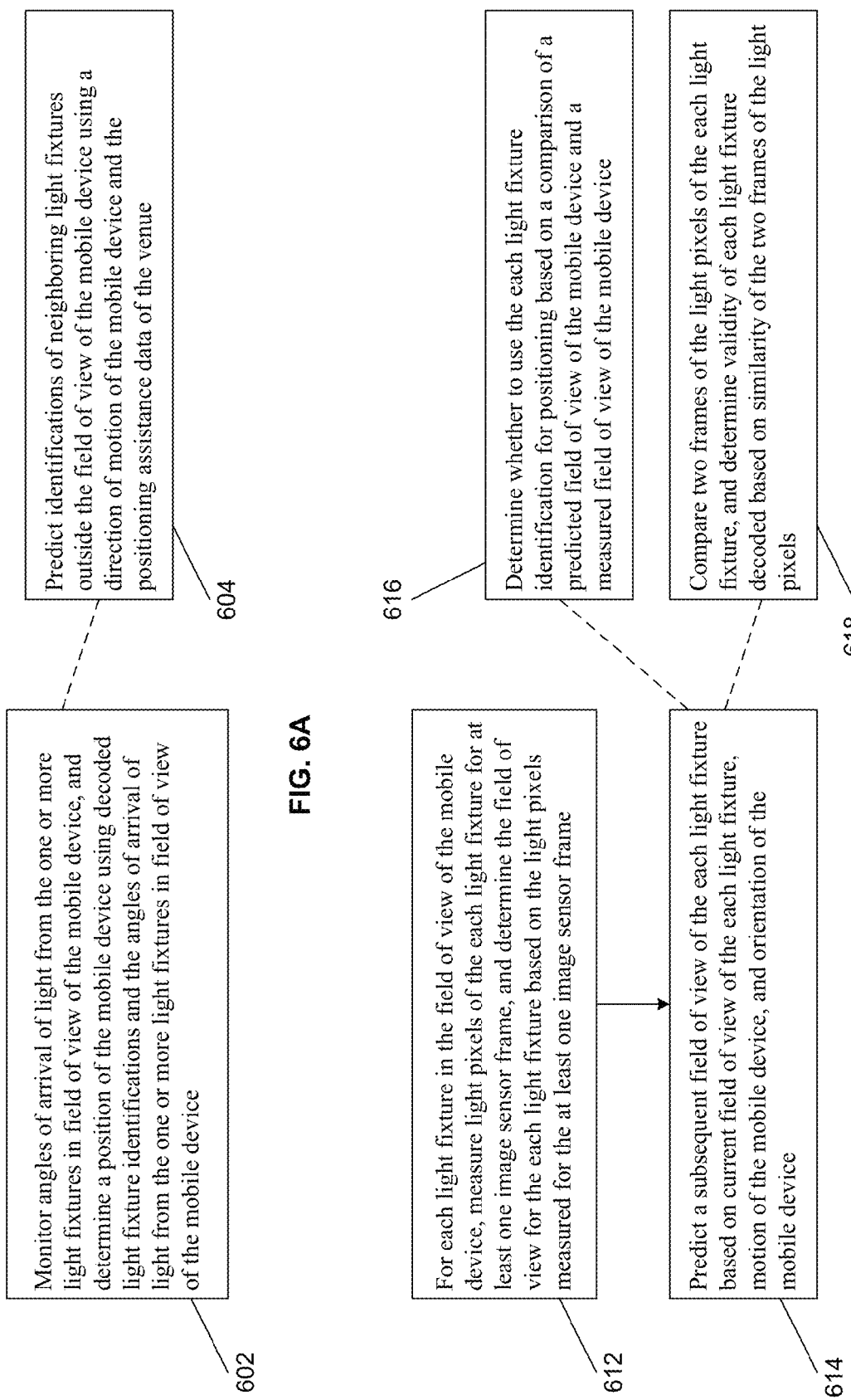
FIG. 6A illustrates an exemplary method of determining a position of a mobile device according to aspects of the present disclosure.
FIG. 6B illustrates an exemplary method of determining a field of view of a mobile device corresponding to a light fixture in a reduced duty cycle state according to aspects of the present disclosure.

FIG. 6A illustrates an exemplary method of determining a position of a mobile device according to aspects of the present disclosure. In block 602, a controller of the mobile device is configured to monitor angles of arrival of light from the one or more light fixtures in field of view of the mobile device, and determine a position of the mobile device using decoded light fixture identifications and the angles of arrival of light from the one or more light fixtures in field of view of the mobile device. According to aspects of the present disclosure, the method performed in block 602 may optionally include the method performed in block 604. In block 604, the controller is configured to predict identifications of neighboring light fixtures outside the field of view of the mobile device using a direction of motion of the mobile device and the positioning assistance data of the venue.

FIG. 6B illustrates an exemplary method of determining a field of view of a mobile device corresponding to a light fixture in a reduced duty cycle state according to aspects of the present disclosure. In block 612, for each light fixture in the field of view of the mobile device, a controller of the mobile device is configured to measure light pixels of the each light fixture for at least one image sensor frame, and determine the field of view for the each light fixture based on the light pixels measured for the at least one image sensor frame. In block 614, the controller is configured to predict a subsequent field of view of the each light fixture based on current field of view of the each light fixture, motion of the mobile device, and orientation of the mobile device.

According to aspects of the present disclosure, the method performed in block 614 may optionally include the methods performed in block 616 and block 618. In block 616, the controller is configured to determine whether to use the each light fixture identification for positioning based on a comparison of a predicted field of view of the mobile device and a measured field of view of the mobile device. In block 618, the controller is configured to compare two frames of the light pixels of the each light fixture, and determine validity of each light fixture decoded based on similarity of the two frames of the light pixels.

FIG. 7A illustrates an exemplar) implementation of determining a position of a mobile device in a VLC environment according to aspects of the present disclosure. In block 702, a controller of the mobile device is configured to measure angles of arrival of light from the one or more light fixtures. In block 704, the controller is configured to compute corresponding distances between the mobile device and the one or more light fixtures using the angles of arrival of light from the one or more light fixtures. In block 706, the controller is configured to determine the position of the mobile device using the distances from the one or more light fixtures with a triangulation method.

FIG. 7B illustrates an exemplary implementation of operating image sensors of a mobile device according to aspects of the present disclosure. In block 712, a controller of the mobile device is configured to operating the image sensors of the mobile device with a programmable duty cycle, where the programmable duty cycle is determined based on the motion of the mobile device, a number of light fixtures in the field of view of the mobile device, and distances between the one or more light fixtures. In block 714, the controller is configured to detect that an orientation of the mobile device has changed substantially from a previous orientation of the mobile device with respect to the one or more light fixtures, and switch the image sensors of the mobile device to a full duty cycle state to decode the one or more light fixtures within the field of view of the mobile device to obtain an updated set of light fixture identifications.

Figure 8:
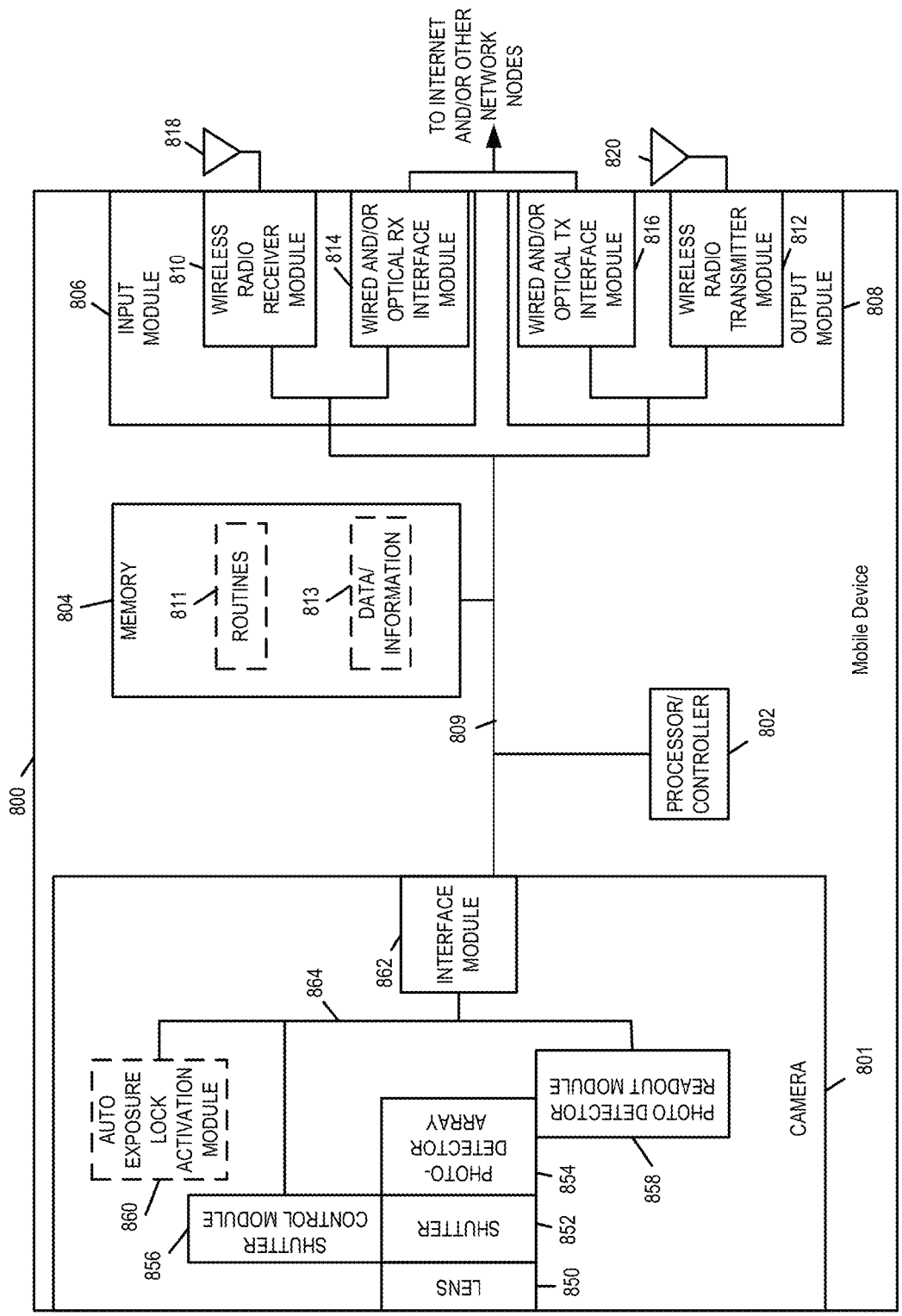
FIG. 8 illustrates an exemplary block diagram of a mobile device for implementing power optimization in visible light communication positioning according to aspects of the present disclosure.

FIG. 8 illustrates an exemplary block diagram of a mobile device for implementing power optimization in visible light communication positioning according to aspects of the present disclosure. As shown in the example of FIG. 8, mobile device 800 may include a camera 801, a processor/controller 802 (which, in some implementations may additionally or alternatively be a controller), memory 804, an input module 806 and an output module 808 coupled together via a bus 809 over which the various components (801, 802, 804, 806, 808) may interchange data and information. In some embodiments, memory 804 includes routines 811 and data/information 813. In some embodiments, the input module 806 and output module 808 may be located internal to the processor/controller 802. The blocks of mobile device 800 can be configured to implement the methods as described in association with FIG. 2 through FIGS. 7A-7B, and FIG. 10.

According to aspects of the present disclosure, camera 801 includes a lens 850, a shutter 852, photo detector array 854 (which is an image sensor), a shutter control module 856, a photo detector readout module 858, an auto exposure lock activation module 860, and an interface module 862. The shutter control module 856, and photo detector readout module 858 and interface module 862 are communicatively coupled together via bus 864. In some embodiments, camera 801 may further include auto exposure lock activation module 860. Shutter control module 856, photo detector readout module 858, and auto exposure lock activation module 860 may be configured to receive control messages from processor/controller 802 via bus 809, interface module 862 and bus 864. Photo detector readout module 858 may communicate readout information of photo detector array 854 to processor/controller 802, via bus 864, interface module 862, and bus 809. Thus, the image sensor, such as the photo detector array 854, can be communicatively coupled to the processor/controller 802 via photo detector readout module 858, bus 864, interface module 862, and bus 809.

Shutter control module 856 may control the shutter 852 to expose different rows of the image sensor to input light at different times, for example, under the direction of processor/controller 802. Photo detector readout module 858 may output information to the processor, for example, pixel values corresponding to the pixels of the image sensor.

Input module 806 may include a wireless radio receiver module 810 and a wired and/or optical receiver interface module 814. Output module 808 may include a wireless radio transmitter module 812 and a wired and/or optical receiver interface module 814. Wireless radio receiver module 810, such as a radio receiver supporting OFDM and/or CDMA, may receive input signals via receive antenna 818. Wireless radio transmitter module 812, such as a radio transmitter supporting OFDM and/or CDMA, may transmit output signals via transmit antenna 820. In some embodiments, the same antenna can be used for transmitting and receiving signals. Wired and/or optical receiver interface module 814 may be communicatively coupled to the Internet and/or other network nodes, for example via a backhaul, and receives input signals. Wired and/or optical transmitter interface module 816 may be communicatively coupled to the Internet and/or other network nodes, for example via a backhaul, and may transmit output signals In various embodiments, processor/controller 802 can be configured to: sum pixel values in each row of pixel values corresponding to a first region of an image sensor to generate a first array of pixel value sums, at least some of the pixel value sums representing energy recovered from different portions of the VLC light signal, the different portions being output at different times and with different intensities; and perform a first demodulation operation on the first array of pixel value sums to recover information communicated by the VLC signal.

In some embodiments, processor/controller 802 can be further configured to: identify, as a first region of the image sensor, a first subset of pixel sensor elements in a sensor where the VLC signal is visible during a first frame time. In some such embodiments, processor/controller 802 can be further configured to identify, a second region of the image sensor corresponding to a second subset of pixel sensor elements in the sensor where the VLC signal may be visible during a second frame time, the first and second regions being different. In some embodiments, processor/controller 802 is further configured to: sum pixel values in each row of pixel values corresponding to the second region of the image sensor to generate a second array of pixel value sums, at least some of the pixel value sums in the second array representing energy recovered from different portions of the VLC light signal, the different portions being output at different times and with different intensities; and perform a second demodulation operation on the second array of pixel value sums to recover information communicated by the VLC signal; and where the first demodulation operation produces a first symbol value and the second demodulation produces a second symbol value.

In various embodiments, the recovered information includes a first symbol value, and different information is recovered from the VLC signal over a period of time. In some embodiments, the array of pixel value sums represents an array of temporally sequential light signal energy measurements made over a period of time.

In various embodiments, the portion of the VLC signal corresponding to a first symbol from which the first symbol value is produced has a duration equal to or less than the duration of a frame captured by the image sensor.

In some embodiments, processor/controller 802 is configured to identify a frequency from among a plurality of alternative frequencies, as part of being configured to perform a demodulation operation. In some embodiments, the transmitted VLC signal includes pure tones or square waves corresponding to tone frequencies equal to or greater than 150 Hz, and the lowest frequency component of the VLC signal may be 150 Hz or larger. In some embodiments, the transmitted VLC signal is a digitally modulated signal with binary amplitude (ON or OFF). In some such embodiments, the transmitted VLC signal is a digitally modulated signal with binary ON-OFF signals whose frequency content is at least 150 Hz.

In some embodiments, processor/controller 802 is configured to perform one of: an OFDM demodulation, CDMA demodulation, Pulse Position Modulation (PPM) demodulation, or ON-OFF keying demodulation to recover modulated symbols, as part of being configured to perform a demodulation operation.

In some embodiments, the image sensor may be a part of a camera that supports an auto exposure lock which when enabled disables automatic exposure, and processor/controller 802 is further configured to: activate the auto exposure lock; and capturing the pixels values using a fixed exposure time setting.

In some embodiments, processor/controller 802 is further configured to detect a beginning of a codeword including a predetermined number of symbols. In some such embodiments, processor/controller 802 is configured to: detect a predetermined VLC synchronization signal having duration equal to or less than the duration of a frame; and interpreting the VLC synchronization signal as an identification of the beginning of the codeword, as part of being configured to detect a beginning of a codeword.

Figure 9:
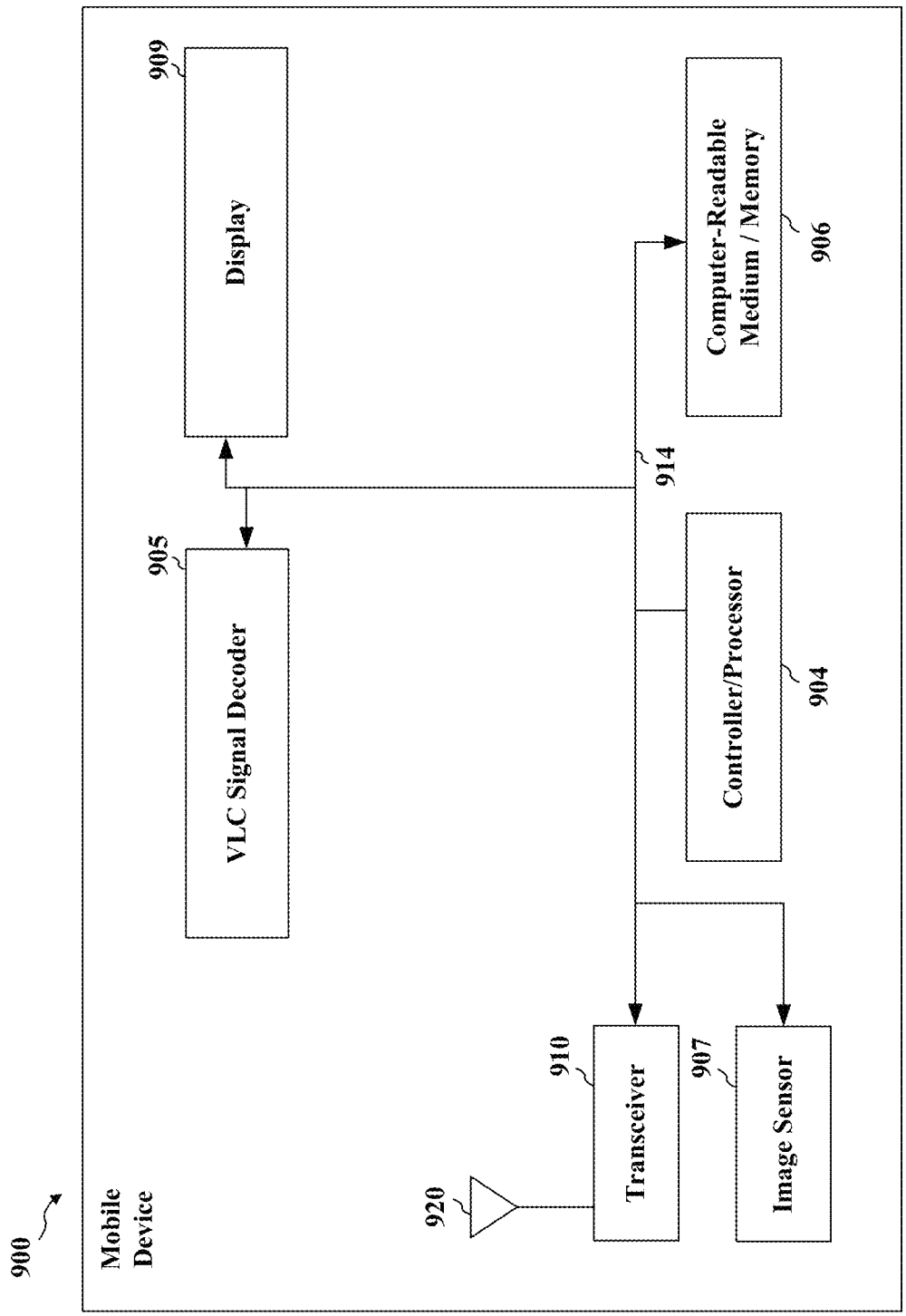
FIG. 9 illustrates another exemplary block diagram of a mobile device for implementing power optimization in visible light communication positioning according to aspects of the present disclosure.

FIG. 9 illustrates another exemplary block diagram of a mobile device for implementing power optimization in visible light communication positioning according to aspects of the present disclosure. As shown in FIG. 9, mobile device 900 may be implemented with computer bus architecture, represented generally by the bus 914. The bus 914 may include any number of interconnecting buses and bridges depending on the specific application of the mobile device 900 and the overall design constraints. The bus 914 links together various circuits including one or more controller/processors and/or hardware components, represented by the controller/processor 904, VLC signal decoder 905, display 909, and the computer-readable medium/memory 906. The bus 914 may also link various other circuits such as timing sources, peripherals, voltage regulators, and power management circuits, which are well known in the art, and therefore, will not be further described.

The mobile device 900 may include a transceiver 910 and an image sensor 907. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the mobile device 900. In addition, the transceiver 910 receives information from the mobile device 900, and based on the received information, generates a signal to be applied to the one or more antennas 920.

The image sensor 907 provides a means for capturing VLC signal frames. The image sensor 907 captures a VLC signal frame from a light source, extracts information from the captured VLC signal frame, and provides the extracted information to the mobile device 900.

The mobile device 900 includes a controller/processor 904 coupled to a computer-readable medium/memory 906, which can include, in some implementations a non-transitory computer readable medium storing instructions for execution by one or more processors, such as controller/processor 904. The controller/processor 904 is responsible for general processing, including the execution of software stored on the computer-readable medium/memory 906. The software, when executed by the controller 904, causes the mobile device 900 to perform the various functions described in FIG. 5, FIGS. 6A-6B, and FIGS. 7A-7B for any particular apparatus. The computer-readable medium/memory 906 may also be used for storing data that is manipulated by the controller 904 when executing software. The mobile device 900 may further include at least one of VLC signal decoder 905, and display 909. Some components may be implemented as software modules running in the controller 904, resident/stored in the computer readable medium/memory 906, or may be implemented as one or more hardware components coupled to the controller 904, or some combination thereof. The components of mobile device 900 can be configured to implement the methods as described in association with FIG. 2 through FIGS. 7A-7B, and FIG. 10.

According to aspects of the present disclosure, the image sensor in the mobile device can be configured to extract a time domain VLC signal from a sequence of image frames that capture a given light fixture. The received VLC signal can be demodulated and decoded by the mobile device to produce a unique identification for a light fixture. Furthermore, an image sensor can in parallel extract VLC signals from images containing multiple light fixtures that are visible in the field of view of the image sensor. In this manner, the mobile device may use multiple independent sources of information to confirm and refine its position.

Each pixel in an image sensor accumulates light energy coming from a narrow range of physical directions, so by performing pixel-level analysis the mobile device can precisely determine the angle of arrival of light from one or more light fixtures. This direction of angle of light enables the mobile device to compute its position relative to a light fixture to within a few centimeters.

By combining the position relative to a light fixture with the information about the location of that light fixture as determined based on the decoded identification coming from the positioning signal, the mobile device can determine its global position in the venue within accuracy of centimeters.

Figure 10:
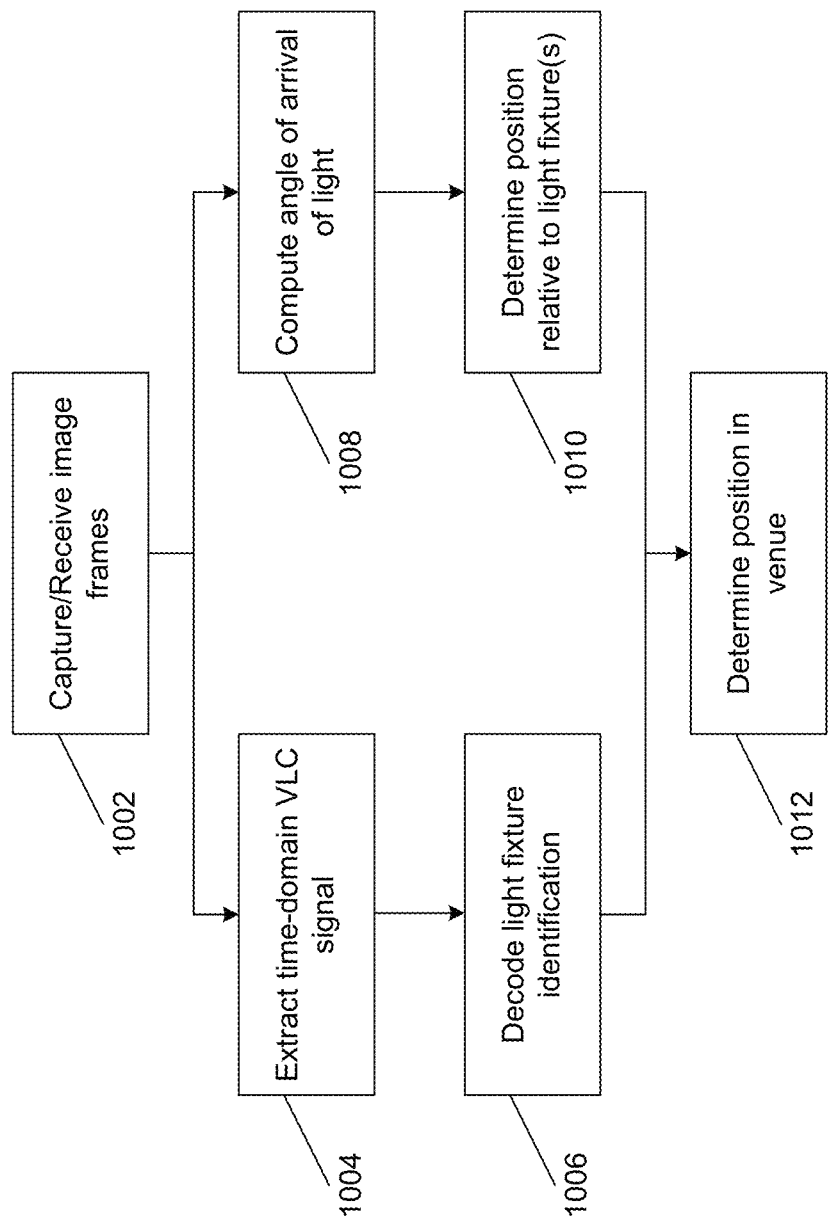
FIG. 10 illustrates an exemplary implementation of determining position of a mobile device according to aspects of the present disclosure.

FIG. 10 illustrates an exemplary implementation of determining position of a mobile device according to aspects of the present disclosure. In the example shown in FIG. 10, in block 1002, an image sensor of the mobile device is configured to capture/receive image frames. In block 1004, a controller of the mobile device is configured to extract time-domain VLC signal from the image frames. In block 1006, the controller is configured to decode light fixture identification using the VLC signal. In block 1008, the controller is configured to compute angle of arrival of light using the image frames received. In block 1010, the controller is configured to determine position of the mobile device relative to the light fixture(s) using the angle of arrival of light. In block 1012, the controller is configured to determine position of the mobile device in the venue based on the decoded light fixture(s) identification and the position of the mobile device relative to the light fixture(s).

One of the benefits of the disclosed positioning method is that VLC-based positioning does not suffer from the uncertainty associated with the measurement models used by other positioning methods. For example, RF-signal-strength-based approaches may suffer from unpredictable multipath signal propagation. On the other hand, VLC-based positioning uses line-of-sight paths whose direction can be more precisely determined using the image sensor.

Another benefit of the disclosed positioning method is that, in addition to providing the position of the device in the horizontal plane, the disclosed positioning method may also provide position of the mobile device in the vertical dimension (the Z-axis). This is a benefit of using angle of arrival of light, which is a three dimensional vector. The ability of obtaining accurate height estimation can enable new applications such as autonomous navigation and operation of drones and forklifts in warehouses and on manufacturing floors.

Another benefit of using directionality of the light vectors is that the mobile device can determine its orientation in the horizontal (X-Y) plane, which is also referred to as the mobile device's azimuth or yaw angle. This information can be used to inform a user which way the user is holding the mobile device relative to other items in the venue. By contrast, a global positioning system (GPS) receiver determines the heading from a time sequence of position estimates which may require the user move in a certain direction before it can determine which way the user is going. With the disclosed approach, the orientation/heading is determined as soon as the first position is computed.

Moreover, the disclosed positioning method may have a low latency and update rate. Typical indoor positioning systems that use RF signals may require many measurements to be taken over time and space in order to get a position fix. With the disclosed approach, the time to first fix can be on the order of 0.1 second and the update rate can be as high as 30 Hz. This ensures a responsive and lively user experience and can even satisfy many of the challenging drone/robot navigation applications.

Furthermore, the disclosed positioning method has better scalability than conventional positioning methods. Conventional positioning methods that require two-way communication between a mobile device and infrastructure typically do not scale well as the number of mobile users and infrastructure access points increases. This is because each mobile-to-infrastructure communication creates interference for other mobile devices, as they attempt to position themselves. In the case of RTT-based positioning in Wi-Fi frequency bands, the interference may also cause a drop in total WLAN throughput. On the other hand, the disclosed VLC-based positioning can be inherently scalable because it employs one-way communication. As a result, the performance of the disclosed positioning approach does not degrade no matter how many users and transmitters may be simultaneously active in the venue.

Another benefit of disclosed method of visible light communication position is that in that VLC enables communication through widely available bandwidth without regulation. In addition, since users can observe a location and direction at which light corresponding to a VLC communication travels, information regarding coverage can be accurately ascertained. VLC can also offer reliable security and low power consumption. In light of these and other advantages, VLC can be applied in locations where the use of RF communications is prohibited, such as hospitals or airplanes, and can also provide additional information services through electronic display boards.

Note that at least the following three paragraphs, FIG. 5 through FIG. 10 and their corresponding descriptions provide support for receiver means (for example transceiver 910) for receiving positioning assistance data of a venue, where the positioning assistance data includes identifications and positions of light fixtures in the venue; decoder means (for example VLC signal decoder 905) for decoding one or more light fixtures within a field of view of the mobile device to obtain corresponding light fixture identifications; controller means (for example controller/processor 904) for determining a motion of the mobile device with respect to the one or more light fixtures based on the light fixture identifications and the positioning assistance data of the venue and switching image sensors of the mobile device to a reduced duty cycle state based on the motion of the mobile device with respect to the one or more light fixtures within the field of view of the mobile device; means for monitoring angles of arrival of light from the one or more light fixtures in field of view of the mobile device; means for determining a position of the mobile device using decoded light fixture identifications and the angles of arrival of light from the one or more light fixtures in field of view of the mobile device; means for measuring light pixels of the each light fixture for at least one image sensor frame; means for determining the field of view for the each light fixture based on the light pixels measured for the at least one image sensor frame; means for measuring angles of arrival of light from the one or more light fixtures; means for computing corresponding distances between the mobile device and the one or more light fixtures using the angles of arrival of light from the one or more light fixtures; means for determining the position of the mobile device using the distances from the one or more light fixtures with a triangulation method; means for predicting identifications of neighboring light fixtures outside the field of view of the mobile device using a direction of motion of the mobile device and the positioning assistance data of the venue; means for detecting that an orientation of the mobile device has changed substantially from a previous orientation of the mobile device with respect to the one or more light fixtures; means for switching the image sensors of the mobile device to a full duty cycle state to decode the one or more light fixtures within the field of view of the mobile device to obtain an updated set of light fixture identifications; and means for measuring an angle of arrival of light from the one or more light fixtures and stopping VLC signal decode for a programmable duration.

The methodologies described herein may be implemented by various means depending upon applications according to particular examples. For example, such methodologies may be implemented in hardware and firmware/software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, or any combination of the above networks, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. 4G Long Term Evolution (LTE) communications networks may also be implemented in accordance with claimed subject matter, in an aspect. A WLAN may comprise an Institute of Electrical and Electronic Engineers (IEEE) 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a CDMA cellular communication protocol, for example, and the femtocell may provide the mobile device access to a larger cellular telecommunication network by way of another broadband network such as the Internet.

Techniques described herein may be used with a GPS that includes any one of several global navigation satellite system (GNSS) and/or combinations of GNSS. Furthermore, such techniques may be used with positioning systems that utilize terrestrial transmitters acting as "pseudolites", or a combination of satellite vehicles (SVs) and such terrestrial transmitters. Terrestrial transmitters may, for example, include ground-based transmitters that broadcast a pseudo noise (PN) code or other ranging code (for example, similar to a GPS or CDMA cellular signal). Such a transmitter may be assigned a unique PN code so as to permit identification by a remote receiver. Terrestrial transmitters may be useful, for example, to augment a GPS in situations where GPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "GPS signals" and/or "SV signals", as used herein, is intended to include GPS-like signals from terrestrial transmitters, including terrestrial transmitters acting as pseudolites or equivalents of pseudolites.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

We claim:

1. A method of power optimization in visible light communication (VLC) positioning of a mobile device, comprising:
   receiving positioning assistance data of a venue, wherein the positioning assistance data includes identifications and positions of light fixtures in the venue;
   decoding one or more light fixtures within a field of view of the mobile device to obtain corresponding light fixture identifications;
   determining a motion of the mobile device with respect to the one or more light fixtures based on the light fixture identifications and the positioning assistance data of the venue; and
   switching image sensors of the mobile device to a reduced duty cycle state based on the motion of the mobile device with respect to the one or more light fixtures within the field of view of the mobile device.

2. The method of claim 1, further comprising:
monitoring angles of arrival of light from the one or more light fixtures in field of view of the mobile device; and
determining a position of the mobile device using decoded light fixture identifications and the angles of arrival of light from the one or more light fixtures in field of view of the mobile device.

3. The method of claim 2, further comprising:
in the reduced duty cycle state, for each light fixture in the field of view of the mobile device,
measuring light pixels of the each light fixture for at least one image sensor frame, and
determining the field of view for the each light fixture based on the light pixels measured for the at least one image sensor frame.

4. The method of claim 3, further comprising:
predicting a subsequent field of view of the each light fixture based on current field of view of the each light fixture, motion of the mobile device, and orientation of the mobile device.

5. The method of claim 4, further comprising:
determining whether to use the each light fixture identification for positioning based on a comparison of a predicted field of view of the mobile device and a measured field of view of the mobile device.

6. The method of claim 4, further comprising:
comparing two frames of the light pixels of the each light fixture; and
determining validity of each light fixture identification decoded based on similarity of the two frames of the light pixels.

7. The method of claim 2, wherein determining the position of the mobile device comprises:
measuring angles of arrival of light from the one or more light fixtures;
computing corresponding distances between the mobile device and the one or more light fixtures using the angles of arrival of light from the one or more light fixtures; and
determining the position of the mobile device using the distances from the one or more light fixtures with a triangulation method.

8. The method of claim 2, further comprising:
predicting identifications of neighboring light fixtures outside the field of view of the mobile device using a direction of motion of the mobile device and the positioning assistance data of the venue.

9. The method of claim 1, wherein switching image sensors of the mobile device to the reduced duty cycle state comprises:
operating the image sensors of the mobile device with a programmable duty cycle, wherein the programmable duty cycle is determined based on the motion of the mobile device, a number of light fixtures in the field of view of the mobile device, and distances between the one or more light fixtures.

10. The method of claim 9, further comprising:
detecting that an orientation of the mobile device has changed substantially from a previous orientation of the mobile device with respect to the one or more light fixtures; and
switching the image sensors of the mobile device to a full duty cycle state to decode the one or more light fixtures within the field of view of the mobile device to obtain an updated set of light fixture identifications.

11. The method of claim 1, wherein in the reduced duty cycle state,
measuring an angle of arrival of light from the one or more light fixtures and stopping VLC signal decode for a programmable duration.

12. A mobile device, comprising:
image sensors configured to receive visible light communication signals;
a memory configured to store the visible light communication signals;
a transceiver configured to receive positioning assistance data of a venue, wherein the positioning assistance data includes identifications and positions of light fixtures in the venue;
a controller configured to:
decode one or more light fixtures within a field of view of the mobile device to obtain corresponding light fixture identifications;
determine a motion of the mobile device with respect to the one or more light fixtures based on the light fixture identifications and the positioning assistance data of the venue; and
switch the image sensors of the mobile device to a reduced duty cycle state based on the motion of the mobile device with respect to the one or more light fixtures within the field of view of the mobile device.

13. The mobile device of claim 12, wherein the controller is further configured to:
monitor angles of arrival of light from the one or more light fixtures in field of view of the mobile device; and
determine a position of the mobile device using decoded light fixture identifications and the angles of arrival of light from the one or more light fixtures in field of view of the mobile device.

14. The mobile device of claim 13, wherein in the reduced duty cycle state, for each light fixture in the field of view of the mobile device, the controller is further configured to:
measure light pixels of the each light fixture for at least one image sensor frame; and
determine the field of view for the each light fixture based on the light pixels measured for the at least one image sensor frame.

15. The mobile device of claim 14, wherein the controller is further configured to:
predict a subsequent field of view of the each light fixture based on current field of view of the each light fixture, motion of the mobile device, and orientation of the mobile device.

16. The mobile device of claim 15, wherein the controller is further configured to:
determine whether to use the each light fixture identification for positioning based on a comparison of a predicted field of view of the mobile device and a measured field of view of the mobile device.

17. The mobile device of claim 15, wherein the controller is further configured to:
compare two frames of the light pixels of the each light fixture; and
determine validity of each light fixture identification decoded based on similarity of the two frames of the light pixels.

18. The mobile device of claim 13, wherein the controller is further configured to:
measure angles of arrival of light from the one or more light fixtures;
compute corresponding distances between the mobile device and the one or more light fixtures using the angles of arrival of light from the one or more light fixtures; and determine the position of the mobile device using the distances from the one or more light fixtures with a triangulation method.

19. The mobile device of claim 13, wherein the controller is further configured to:
predict identifications of neighboring light fixtures outside the field of view of the mobile device using a direction of motion of the mobile device and the positioning assistance data of the venue.

20. The mobile device of claim 12, wherein the controller is further configured to:
operate the image sensors of the mobile device with a programmable duty cycle, wherein the programmable duty cycle is determined based on the motion of the mobile device, a number of light fixtures in the field of view of the mobile device, and distances between the one or more light fixtures.

21. The mobile device of claim 20, wherein the controller is further configured to:
detect that an orientation of the mobile device has changed substantially from a previous orientation of the mobile device with respect to the one or more light fixtures; and
switch the image sensors of the mobile device to a full duty cycle state to decode the one or more light fixtures within the field of view of the mobile device to obtain an updated set of light fixture identifications.

22. The mobile device of claim 12, wherein in the reduced duty cycle state, the controller is further configured to:
measure an angle of arrival of light from the one or more light fixtures and stopping VLC signal decode for a programmable duration.

23. A mobile device, comprising:
receiver means for receiving positioning assistance data of a venue, wherein the positioning assistance data includes identifications and positions of light fixtures in the venue;
decoder means for decoding one or more light fixtures within a field of view of the mobile device to obtain corresponding light fixture identifications; and
controller means for determining a motion of the mobile device with respect to the one or more light fixtures based on the light fixture identifications and the positioning assistance data of the venue, and switching image sensors of the mobile device to a reduced duty cycle state based on the motion of the mobile device with respect to the one or more light fixtures within the field of view of the mobile device.

24. The mobile device of claim 23, further comprising:
means for monitoring angles of arrival of light from the one or more light fixtures in field of view of the mobile device; and
means for determining a position of the mobile device using decoded light fixture identifications and the angles of arrival of light from the one or more light fixtures in field of view of the mobile device.

25. The mobile device of claim 24, further comprising:
in the reduced duty cycle state, for each light fixture in the field of view of the mobile device,
means for measuring light pixels of the each light fixture for at least one image sensor frame; and
means for determining the field of view for the each light fixture based on the light pixels measured for the at least one image sensor frame.

26. The mobile device of claim 24, wherein the controller means for determining the position of the mobile device comprises:
means for measuring angles of arrival of light from the one or more light fixtures;
means for computing corresponding distances between the mobile device and the one or more light fixtures using the angles of arrival of light from the one or more light fixtures; and
means for determining the position of the mobile device using the distances from the one or more light fixtures with a triangulation method.

27. The mobile device of claim 24, further comprising:
means for predicting identifications of neighboring light fixtures outside the field of view of the mobile device using a direction of motion of the mobile device and the positioning assistance data of the venue.

28. The mobile device of claim 27, further comprising:
means for detecting that an orientation of the mobile device has changed substantially from a previous orientation of the mobile device with respect to the one or more light fixtures; and
means for switching the image sensors of the mobile device to a full duty cycle state to decode the one or more light fixtures within the field of view of the mobile device to obtain an updated set of light fixture identifications.

29. The mobile device of claim 23, wherein in the reduced duty cycle state, further comprising:
means for measuring an angle of arrival of light from the one or more light fixtures and stopping VLC signal decode for a programmable duration.

30. A non-transitory medium storing instructions for execution by one or more processors of a mobile device, the instructions comprising:
instructions for extracting identifications and positions of light figures in a venue from received positioning assistance data of the venue;
instructions for decoding one or more light fixtures within a field of view of the mobile device to obtain corresponding light fixture identifications;
instructions for determining a motion of the mobile device with respect to the one or more light fixtures based on the light fixture identifications and the positioning assistance data of the venue; and
instructions for switching image sensors of the mobile device to a reduced duty cycle state based on the motion of the mobile device with respect to the one or more light fixtures within the field of view of the mobile device.

* * * * *